United States Patent [19]

Rolph

[11] 4,125,883

[45] Nov. 14, 1978

[54] APPARATUS FOR CENTERING AND CLAMPING A FLEXIBLE MAGNETIC RECORDING DISC

[75] Inventor: Donald L. Rolph, Pleasanton, Calif.

[73] Assignee: Memorex Corporation, Santa Clara, Calif.

[21] Appl. No.: 830,135

[22] Filed: Sep. 2, 1977

[51] Int. Cl.² .................. G11B 5/016; G11B 17/02
[52] U.S. Cl. ................................................. 360/99
[58] Field of Search .............. 360/99, 97; 274/9 B, 274/10 S; 346/137

[56] References Cited

U.S. PATENT DOCUMENTS

| | | | |
|---|---|---|---|
| 3,768,815 | 10/1973 | Mathurin | 346/137 |
| 4,040,106 | 8/1977 | Medley | 360/99 |

Primary Examiner—Robert S. Tupper

[57] ABSTRACT

Apparatus for centering and clamping a flexible magnetic recording disc in a disc drive comprises a spindle having on its outer end a face for supporting the associated recording disc and also has a recess within that face and a disc clamping element which cooperates with the spindle and includes a plurality of resiliently deflectable fingers extending in a direction both angularly outwardly of the axis and toward the spindle with means for deflecting the fingers radially outwardly for centering the associated recording disc with respect to the center of the spindle, and means for selectively moving the clamping element toward and away from the spindle and into and out of releasable engagement with the recording disc and spindle.

5 Claims, 5 Drawing Figures

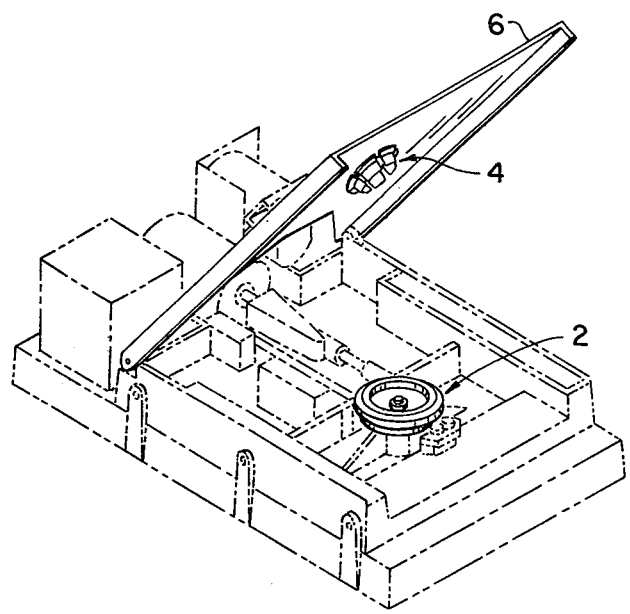
FIG._1.
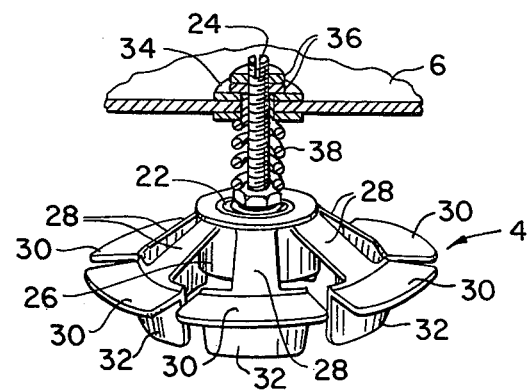
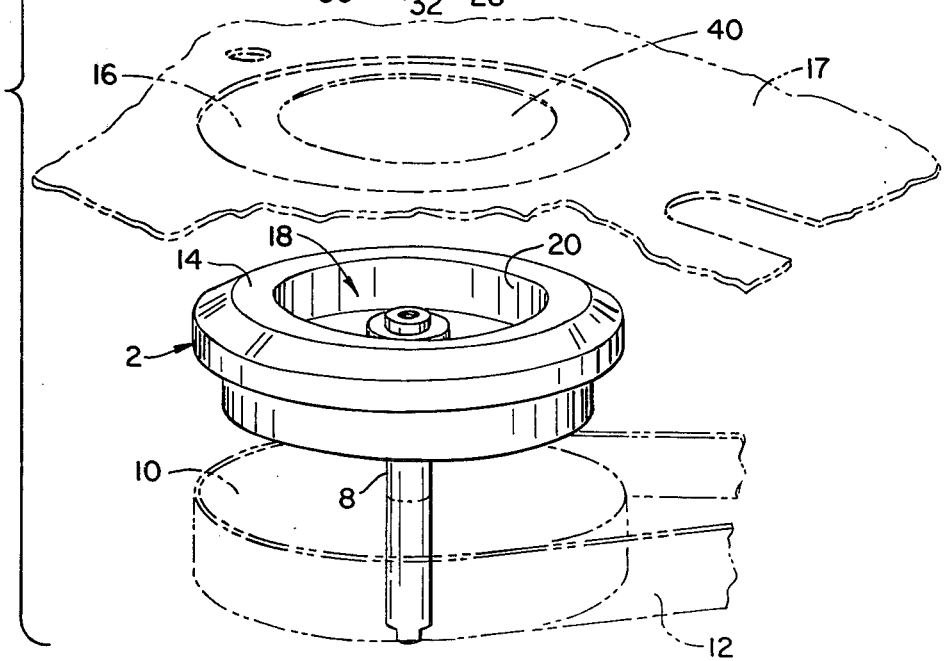
FIG._2.

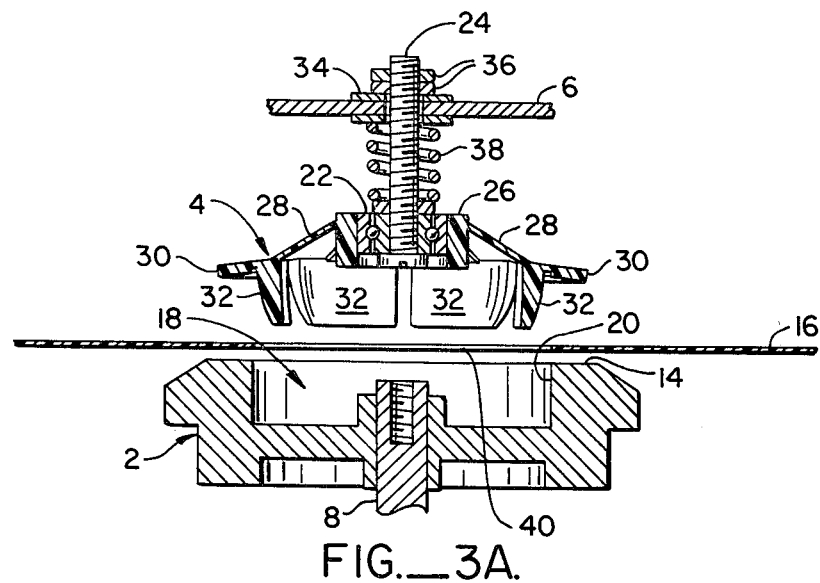
FIG._3A.
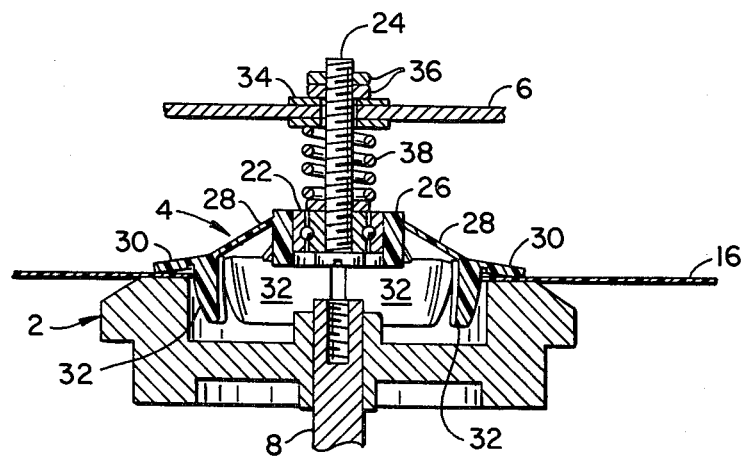
FIG._3B.
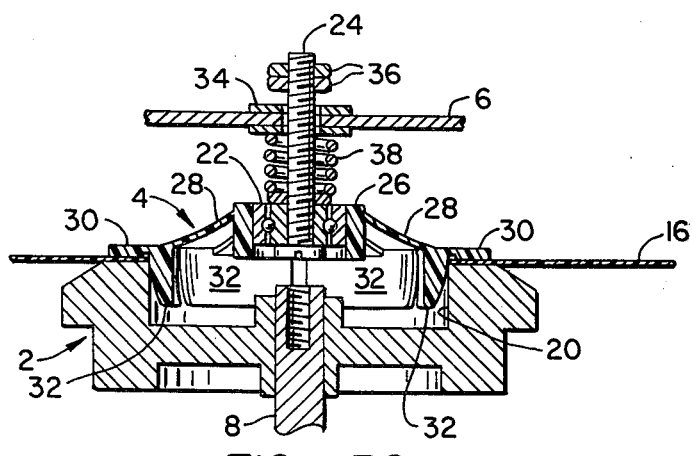
FIG._3C.

APPARATUS FOR CENTERING AND CLAMPING A FLEXIBLE MAGNETIC RECORDING DISC

BACKGROUND OF THE INVENTION

This invention relates to apparatus for clamping and centering a flexible magnetic recording disc in a disc drive.

Disc drive units incorporating inexpensive, flexible, removable magnetic recording discs have become very popular in the field of data processing. These drives and their associated discs provide for a relatively inexpensive means for storing data, diagnostic codes, or programs for computers and other types of equipment. Because of the low cost recording media used therein and its replaceability, these devices have provided for an inexpensive means of providing such stored information in a wide variety of equipment. A number of manufacturers are now producing generally similar disc drives of this nature, with one relatively new and increasingly popular such drive being the Memorex Model 550, within which the subject matter of the present invention may be incorporated. The recording media generally used in such disc drives is in the form of a relatively thin and flexible plastic disc coated with a magnetic recording material and enclosed within an envelope providing for limited access to the recording surface of the disc and access to a central, circular aperture which is used for centering and clamping the disc to the disc drive.

Various types of disc centering and clamping structures have been incorporated and disclosed in the prior art. Typical of such clamping apparatus has been that disclosed in U.S. Pat. No. 3,678,481 and that disclosed in U.S. Pat. No. 3,768,815. Among the requirements for such a disc centering and clamping structure have been the ability to effectively and positively center the disc with respect to the axis of rotation of the drive spindle prior to clamping it immovably in place on that spindle, reliability of operation, and simplicity and low cost of manufacture and assembly. The various prior art clamping devices have, in general, been unnecessarily complex and frequently lacking in the ability to center a disc effectively prior to clamping it firmly against the drive spindle. This failure to center properly can result in damage to the material surrounding the central aperture of the disc as well as an eccentric recording and substantial compromises in the ability of the disc and drive combination to reproduce accurately data previously recorded thereupon. The inability of many of the prior are devices to center the disc adequately prior to clamping has become a particularly acute problem with respect to the more recently developed disc drives in which the recording density has been substantially increased and the distance between adjacent recording tracks has been substantially decreased.

SUMMARY OF THE INVENTION

It is the object of this invention to provide a centering and clamping apparatus for use in a flexible magnetic recording disc drive which effectively centers the recording disc with respect to the center of rotation of the drive spindle and then clamps the recording disc firmly against the drive spindle for rotational drive by that spindle. It is also an object of the invention to provide such a centering and clamping apparatus which is both effective in operation and reliable in service. It is yet another object of this invention to provide such a centering and clamping apparatus which is economical to manufacture and assemble. It is a further object of this invention to provide such a centering and clamping apparatus in which the clamping element is a single unitary element formed of a generally rigid synthetic resin.

The centering and clamping apparatus of this invention comprises a spindle mounted to the end of a rotatable drive shaft and having at its outer end a face for supporting the associated recording disc, a disc clamping element rotatable about an axis and selectively movable toward and away from the spindle, and means for selectively moving the clamping element toward and away from the spindle and into and out of releasable engagement with the recording disc and spindle. The spindle includes a recess within the face which is concentric with the drive shaft and is defined by an inner wall. The disc clamping element includes a plurality of resiliently deflectable fingers extending in a direction both angularly outwardly of the axis of rotation and toward the spindle and drive shaft, the outermost portions of the fingers including means for deflecting those fingers radially outwardly for centering the associated recording disc with respect to the center of the spindle and drive shaft and for clamping the disc against the spindle face when the clamping element is brought into engagement with the disc and spindle.

BRIEF DESCRIPTION OF THE DRAWINGS

The disc clamping and centering apparatus of this invention will be discussed in detail with respect to the accompanying drawings in which:

FIG. 1 is a perspective view of the disc clamping apparatus of this invention, with a disc drive in which it is incorporated being shown in phantom;

FIG. 2 is an enlarged perspective view, partially in section, of the spindle and disc clamping element of the apparatus of FIG. 1; and FIGS. 3A through 3C are side sectional views of the apparatus of this invention illustrated in the various stages of its engagement with a flexible magnetic recording disc.

DETAILED DESCRIPTION OF A PREFERRED EMBODIMENT

A particularly preferred embodiment of the flexible magnetic disc centering and clamping apparatus of this invention is illustrated in FIGS. 1 through 3. In FIG. 1 the centering and clamping apparatus of this invention is illustrated mounted within a suitable magnetic disc drive, such as the well known Memorex Model 550. The portions of this disc drive which form no part of the invention are shown in phantom. The basic components of this centering and clamping apparatus include the spindle 2 which is mounted and driven for rotational movement on the chassis of the disc drive shown in phantom, the clamping element 4 and the hinged panel 6 or other suitable means for selectively moving the clamping element toward and away from the spindle. For purposes of illustration in FIG. 1 the panel 6, hinged to the chassis of the disc drive shown in phantom, is shown pivoted well open, far more open than is necessary or would likely be the case in an operational disc drive.

In FIG. 2 and in the sectional views of FIGS. 3A through 3C the principal components of the apparatus of this invention are represented at a larger scale to illustrate more clearly the principles of the invention.

The spindle 2, formed of a suitable material such as steel, is mounted at the end of a rotatable drive shaft 8, which may be mounted by suitable bearings to the chassis of the disc drive (not shown). The drive shaft conventionally may be provided at its opposite end with a drive pulley 10 (shown in phantom) driven by a suitable belt 12 (shown in phantom) from a suitable drive motor (not shown). At its outer end the spindle has a flat face 14 for receiving and supporting the recording disc 16 (shown in phantom in FIG. 2). Additionally, the outer end of the spindle 2 includes a recess 18 within the face 14, defined by inner wall 20. This recess 18 is circular, preferably in the form of a truncated cylinder and is concentric with drive shaft 8.

The disc clamping element 4 is suitably formed as a unitary molding of a generally rigid synthetic resin, such as nylon or the like. This clamping element 4 is rotatably mounted by means of a bearing 22 to a shaft 24, which in turn is attached to the plate 6 pivotally mounted to the disc drive chassis. The shaft 24, suitably in the form of a bolt or other threaded member, defines the axis of rotation of the clamping element 4 and is slidably attached to the plate 6 so that, when the clamping element 4 is brought into engagement with the spindle 2 as illustrated in FIGS. 3A through 3C, the axes of rotation of both the spindle and the clamping element 4 will be collinear.

Clamping element 4 includes the bearing-receiving central body 26 with a plurality of resiliently deflectable fingers 28 extending both angularly outwardly of the central body 26 and thus shaft 24 and also toward the spindle 2 and drive shaft 8. Thus, in the orientation illustrated in FIGS. 2 and 3A through 3C the resiliently deflectable fingers 28 angle downwardly toward the spindle 2 and outwardly of the axis of rotation of the clamping element 4 in a generally conical fashion. The outermost portions of the fingers 28 include both generally radially extending tabs 30 and portions 32 extending generally axially outwardly (downwardly in FIGS. 2 and 3A through 3C) of the clamping member 4. Axially extending portions 32 suitably define sectors of a circle which, when the fingers are in their undeflected state (FIGS. 2, 3A and 3B), has a diameter which is smaller than the diameter of the spindle recess 18, for purposes to be described below. The generally radially outwardly extending tabs 30 suitably define sectors of an annular figure which generally corresponds to the size of the face 14 of the spindle.

In this preferred embodiment the clamping element shaft 24 preferably is mounted to the pivotal plate 6 by means providing for a predetermined amount of movement of the clamping element 4 toward and away from and a limited amount of movement transversely of the plate 6. Conveniently this mounting may be effected by a bushing 34 in the plate 6 having a central aperture slightly larger than shaft 24, through which the shaft 24 projects, with stopping means such as lock nuts 36 retaining the shaft against further movement of the clamping element 4 away from plate 6. Resilient biasing means, such as compression spring 38 preferably are provided between the plate 6 and the clamping element bearing 22 for resiliently urging the clamping element 4 away from the plate 6.

By virtue of the structure described above, the method of centering and clamping a flexible disc 16 may be seen with respect to FIGS. 3A through 3C. FIG. 3A represents the configuration of the spindle and clamping element when the disc drive is in its open, disc receiving configuration. In this configuration a cartridge 17 containing flexible disc 16 may be inserted into the disc drive and, by suitable mechanical stops and guides (not shown) is positioned such that the central aperture 40 of the disc is generally concentric with the spindle 2 and clamping element 4. The diameter of the circular central aperture 40 of the flexible recording disc 16 is standardized throughout the industry, and the diameter of the recess 18 within the spindle is dimensioned to be substantially the same as the diameter of the disc aperture 40. Since the axially projecting portions 32 of the clamping element 4 define sectors of a circle which, when the fingers 28 are in their undeflected configuration, has a diameter smaller than the diameter of the spindle recess 18 and thus the disc aperture 40, these axially extending portions 32 may be introduced without binding through the disc aperture 40 and into the spindle recess 18, as indicated in FIGS. 3A and 3B. The introduction of the clamping element 4 through the disc aperture 40 and into the spindle recess 18 is accomplished by closing the pivotally mounted panel 6 and thus moving the clamping element toward the spindle. The ready insertion of the projections 32 of the clamping element 4 is further facilitated by the generally conically inward taper provided on those projections 32 and illustrated in the sectional views of FIGS. 3A through 3C.

As illustrated in FIG. 3B, continued advancement of the clamping member toward the disc 16 and spindle 2, as the panel 6 is further closed, brings the generally radially projecting tabs 30 into engagements with the disc 16 immediately adjacent the aperture 40 and urges that disc into engagement with the face 14 of the spindle 2. Since, at this point, the disc has been only approximately centered with respect to the axis of rotation defined by shaft 8, it is important that the disc be more accurately centered before it is rigidly clamped against the spindle 2. This function is achieved by the configuration of the clamping element 4 in the following manner. As the generally radially extending tabs 30 more fully engage the disc 16, as the body 26 of the clamping element 4 is further advanced toward the spindle, these tabs 30 themselves may no longer advance axially along with the body 26 of the clamping element 4. Thus, the configuration of the clamping element fingers 28, extending angularly outwardly and axially toward the spindle 2 and drive shaft 8, and their engagement with the disc 16 and spindle 2 cause the fingers 28 to flex radially outwardly, thus spreading the axially extending portions 32 from their undeflected positions, as shown in FIG. 3C. As long as this radial spreading continues, the disc 16 is not rigidly clamped against the face 14 of the spindle 2 by the clamping element 4 and may be repositioned slightly as necessary to center the disc. By virtue of the plurality of the generally axially extending finger portions 32 defining sectors of a circle, the radial spreading of these portions 32 will continue until they firmly engage the wall 20 defining the spindle recess 18. Since this recess is dimensioned to be of substantially the same diameter as the standardized central aperture 40 of the disc 16, the expansion of the clamping element axial finger portions 32 against the spindle recess wall 20 will force the central aperture of disc 16 into substantial concentricity with the spindle recess 18 and thus with the axis of rotation of the spindle 2.

Provision of the compression spring 38 urging the clamping element 4 away from the pivotally mounted plate 6 enables the plate 6 to be brought further toward the spindle 2 and locked in place, with the compression of spring 38 providing for resilient engagement between the clamping element 4 and the disc 16 and spindle 2 in order to maintain satisfactory level of engagement between these elements despite minor variations in the positioning of the pivotal plate 6.

Upon movement of the plate 6 away from its position shown in FIG. 3C and toward the position shown in FIG. 3A, the clamping engagement between the clamping element 4 and the disc 16 and spindle 2 is released, thus permitting removal and replacement of the disc 16 with another suitable disc. Upon the reinsertion of another disc, the same procedure illustrated in FIGS. 3A through 3C may be repeated to center and clamp the disc in place for use.

From the foregoing it may be seen that this invention provides for an exceptionally simple and economical, as well as positive, means for centering and clamping a flexible magnetic recording disc to a disc drive. While the foregoing description describes a particularly preferred embodiment of the invention, it is to be recognized that such description is for purposes of illustration only and is not to be considered limitative of the principles of the invention. Thus, since numerous variations and modifications of structure, all within the scope of this invention, will readily occur to those skilled in the art, the invention is not to be limited by the foregoing description but solely by the claims appended hereto.

What is claimed is:

1. Apparatus for centering and clamping a flexible magnetic recording disc in a disc drive, comprising
   a spindle mounted to the end of a rotatable drive shaft and having at its outer end a face for supporting the associated recording disc and also a recess within said face, said recess being defined by an inner wall,
   a disc clamping element mounted to said disc drive for rotation about an axis and selective movement toward said spindle for engagement with said spindle and away from said spindle, said element including a central portion encompassing said axis with a plurality of resiliently deflectable fingers extending outwardly therefrom, each of such fingers extending outwardly from said central portion in a direction toward said spindle and said drive shaft, the outermost portions of said fingers including means for cooperation with said recording disc and said spindle to deflect said fingers radially outwardly for centering the associated recording disc with respect to the center of said spindle and drive shaft and for clamping said recording disc against said spindle face when said clamping element is brought into engagement with said disc and said spindle and said element central portion is moved toward said spindle, and
   means for selectively moving said clamping element toward and away from said spindle and into and out of releasable engagement with said recording disc and said spindle, whereby the engagement of the fingers with the recording disc and the spindle and configuration of the fingers and movement of the element central portion serve to center and clamp the recording disc against the spindle face.

2. The apparatus of claim 1 further comprising
   means mounting said clamping element to said moving means and providing for a predetermined amount of movement of said clamping element toward and away from said moving means, and
   means resiliently urging said clamping element away from said moving means, whereby the resilient urging means provides for resilient engagement between the clamping element and the disc and spindle when the moving means brings the clamping element into engagement with the disc and spindle.

3. The apparatus of claim 1 wherein said spindle recess defined by said inner wall is circular, and wherein the outermost portions of said clamping element include portions projecting generally axially outwardly of said clamping element, said axially outwardly projecting portions defining sectors of a circle having a diameter which, when said fingers are undeflected, is smaller than the diameter of said spindle recess, whereby, when the clamping element is brought into engagement with the spindle, the finger axially outwardly projecting portions may project into the spindle recess and then, upon radially outward deflection, may be brought into engagement with the spindle recess inner wall.

4. The apparatus of claim 3 wherein said disc includes a circular central aperture and wherein said spindle recess is concentric with said drive shaft and is of substantially the same diameter as said disc central aperture, whereby, upon the outward deflection of the clamping element fingers, the finger portions projecting into the spindle recess will deflect outwardly into engagement with both the recess inner wall and the periphery of the disc aperture to center the disc with respect to the spindle and drive shaft.

5. The apparatus of claim 4 wherein said finger deflecting means comprise generally radially outwardly extending tabs adjacent the outermost portions of said clamping element fingers for engaging said disc and clamping said disc against said spindle when said clamping element is brought into engagement with said disc and spindle, whereby the engagement of the disc and spindle by the tabs serves to prevent further movement of the clamping element finger outer portions axially of the spindle and cause further movement of the clamping element toward the spindle to effect the radially outward deflection of the clamping element fingers.

* * * * *